May 9, 1961 P. V. KELLY ET AL 2,983,518

PICK-UP CARTRIDGE AND STYLUS SUPPORTING NOSEPIECE THEREFOR

Filed Jan. 21, 1958

INVENTORS
PAUL VINCENT KELLY
EDWARD R. MC KEE

BY Francis J. Klempay
ATTORNEY 2,983,518
Patented May 9, 1961

2,983,518

PICK-UP CARTRIDGE AND STYLUS SUPPORTING NOSEPIECE THEREFOR

Paul Vincent Kelly, West Springfield, Pa., and Edward R. McKee, Conneaut, Ohio, assignors to The Astatic Corporation, Conneaut, Ohio, a corporation of Ohio Filed Jan. 21, 1958, Ser. No. 710,355

3 Claims. (Cl. 274—37)

The present invention relates in general to the art of sound reproduction and more particularly to pick-up cartridges of the type employed in phonograph equipment.

As will be understood by those familiar with the art, a phonograph pick-up cartridge is mounted in the outer free end of a tone arm and serves as a means for sensing the undulations of a record disc and translating such undulations into electrical signals. The sensing means usually comprises one or more record engaging styli while the transducing mechanism which actually translates the mechanical vibrations to electrical signals may operate in any of a number of well known modes of operation. For example, transducer mechanisms of the piezoelectric, dynamic, variable reluctance, variable capacity, etc., types are employed in the art. In the illustrated embodiment of the invention a piezoelectric type of transducer mechanism is used but it will be apparent that the teachings of the invention are equally applicable to pick-up cartridges with other types of transducing mechanisms.

A pick-up cartridge is a rather small assembly and being mounted at the outer free end of a tone arm is often subjected to abuse and rough handling. For example, if the tone arm is dropped on a record (not an uncommon occurrence) the entire pick-up cartridge is subjected to undue forces which may result in its breakage. Further, the pick-up cartridge may be subjected to damage during installation and replacement of the pick-up cartridge itself or the record engaging stylus.

In the design and construction of pick-up cartridges it has become increasingly important to provide extreme degrees of mechanical compliance or flexibility in the physical connection between the transducing mechanism and the record disc. Additional compliance is incorporated in the clamping of the transducer element in its housing. Cartridges having a high degree of compliance are in great demand in "high fidelity" phonograph equipment. However, this increased compliance results in an assembly which is inherently prone to physical damage and, as explained above, a pick-up cartridge may be subject to very rough handling during use, installation and/or replacement.

It is therefore the primary or ultimate object of the invention to provide a phonograph pick-up cartridge of the type having a high degree of compliance but yet which includes means for protecting the transducing mechanism from damaging resulting from abuse during use, replacement and/or installation or mechanical failure of the playing equipment.

A further object is to provide means for protecting a phonograph pick-up cartridge against damage from forces occurring from different directions, such as laterally, vertically and/or longitudinally, for example. In this manner the pick-up cartridge is protected from forces from any direction.

In accordance with the teachings of the present invention a record engaging stylus is coupled with a transducing mechanism by a unitary stylus supporting nosepiece. It is this nosepiece, in conjunction with the cartridge housing itself, which serves to limit the movement of the transducing mechanism. The stylus supporting nosepiece is preferably made of some resilient material and this material can be selected on the basis of its physical properties to provide the desired compliance in the pick-up cartridge.

Another object of the invention is to provide an improved supporting nosepiece for a pick-up cartridge which serves to help protect the cartridge from undue forces in any direction due to rough handling, etc.

A further object is to provide a pick-up cartridge which is characterized by its extreme simplicity, low cost and superior technical performance.

These as well as other objects and advantages of the invention will become more readily apparent upon consideration of the following specification and accompanying drawing wherein there is described and shown a certain preferred embodiment of the invention.

Figures 1, 2, 3, 4:
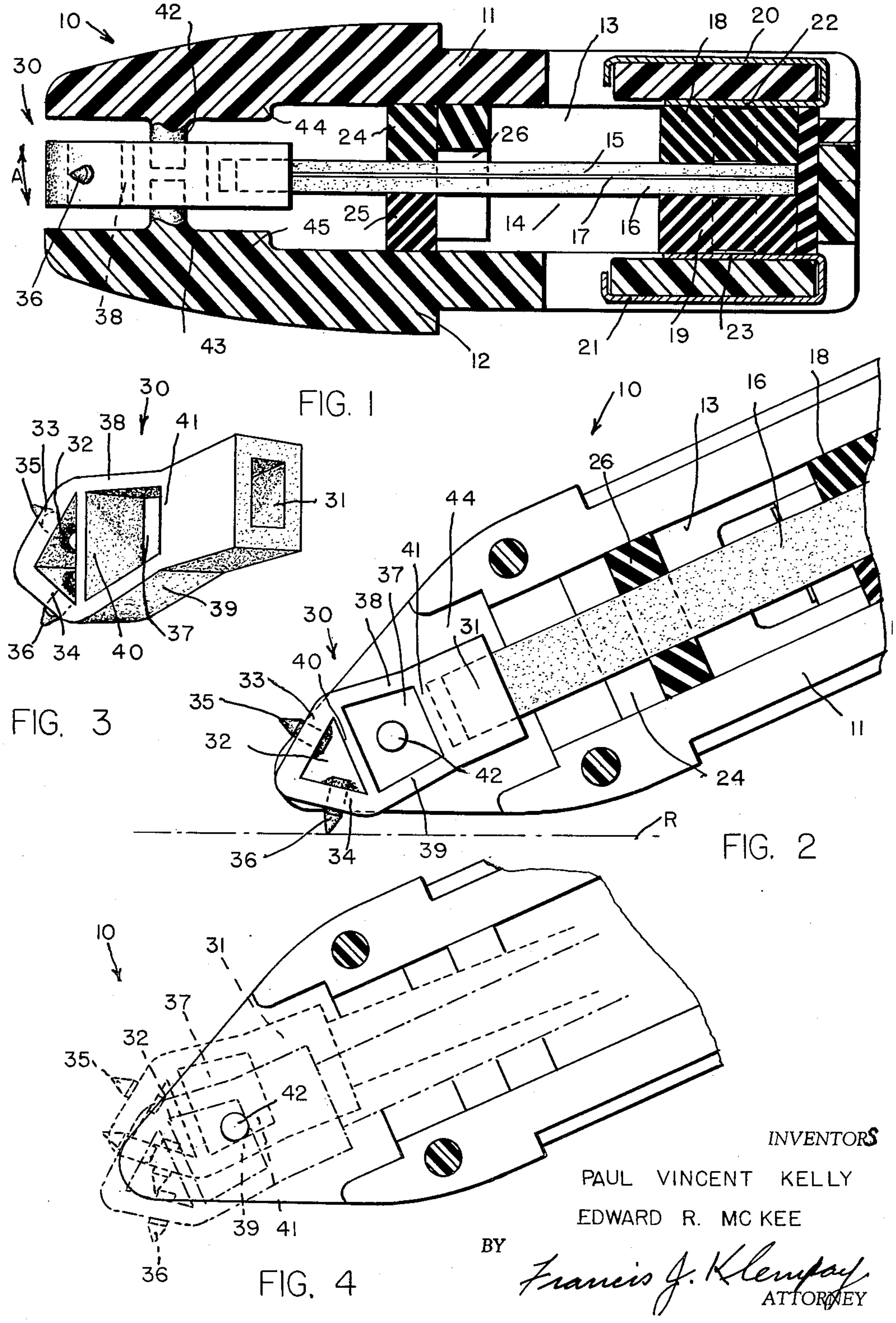
Figure 1 is a plan sectional view of a phonograph pick-up cartridge constructed in accordance with the teachings of the present invention.
Figure 2 is a fragmentary vertical sectional view of the cartridge assembly shown in Figure 1.
Figure 3 is a perspective view of the stylus supporting nosepiece used in the cartridge of Figure 1.
Figure 4 is a fragmentary vertical sectional view of the pick-up cartridge showing certain of the parts thereof in positions of limited movement.

Referring now to the drawing, and initially to Figures 1 and 2 thereof, the reference numeral 10 indicates the general assembly of the phonograph pick-up cartridge which is adapted to be mounted in the outer free end of a phonograph tone arm, not shown, for universal movement across the surface of a phonograph record disc. The phonograph pick-up cartridges comprise a pair of properly formed housing halves 11 and 12 which are cemented together to provide a cartridge housing having a generally hollow interior 13. The shape of the resultant cartridge housing is as shown in the various views of the drawing to provide a removable plug-in type of cartridge which is adapted to be releasably received in a suitable socket, not shown, in the outer free end of a phonograph tone arm.

Mounted within the hollow interior of the pick-up cartridge housing is a piezoelectric transducer element 14 which is the active element of the assembly for translating mechanical vibrations to electrical signals. As shown, the transducer element 14 has its main axis aligned with and positioned along the longitudinal axis of the pick-up cartridge housing. The piezoelectric transducer element 14 is of the well known bimorph type—comprising a pair of piezoelectric slabs 15 and 16 separated by a suitable conductive center core or filling 17 and having the opposite major faces thereof coated with thin layers of conductive material to provide electrodes, not specifically shown. Of course, other types of transducer mechanisms are within the scope of the present invention.

The right end of transducer element 14 is clamped and supported in the housing by resilient rubber or plastic clamp pads 18 and 19 so that the rear end thereof is clamped while the opposite or forward end is substantially free for movement. Contact terminals 20 and 21 are mounted in recesses on the outer peripheral surfaces of the housing halves 11 and 12, respectively, and these contact terminals are in electrical contact with the outer electrodes of the transducer element by means of the foil leads 22 and 23. The arrangement is such that when the forward free end of the transducer element is properly flexed an electrical potential is generated which is conducted to ancillary amplifying equipment, not shown, by the foil leads and contact terminals when the pickup cartridge is inserted into its socket.

Embracing the transducer element 14 at a point slightly forward of its mid-point and bearing against the major faces thereof are a pair of soft rubber bender pads 24 and 25 which substantially fill the space between the inner walls of the cartridge housing and the transducer element. This provides, in effect, a resilient fulcrum over which transducer element 14 can be bent upon the forward end thereof being flexed in the direction of the arrow A in Figure 1 of the drawing.

Immediately to the rear of bender pads 24 and 25 we provide a generally U-shaped damping member 26. Damping member 26 contacts the minor end surfaces of the transducer element but does not touch the major surfaces thereof and centers the element within the hollow interior 13 of the cartridge.

Attached to the free end of the transducer element is a stylus supporting nosepiece 30 which serves not only as a coupling means for coupling the record disc engaging stylus and the transducer but also as a protective device to prevent damage to the cartridge. This member is preferably formed from a properly chosen resilient material, such as nylon or some other elastomer, for example, having the desired physical properties to afford the requisite degrees of mechanical strength and compliance.

The stylus supporting nosepiece 30, as shown particularly in Figure 3, comprises an elongated rearwardly projecting hollow rectangular portion 31 which is adapted to nestingly receive the forward end of the transducer element. The nosepiece is cemented to the transducer element and thus is rigidly carried thereby. Positioned forwardly of the hollow rectangular element 31 is a triangular stylus supporting portion 32 whose converging walls 33 and 34 are apertured to receive a pair of record disc engaging styli 35 and 36, respectively, which may be of different size for playing various types of record discs. Styli 35 and 36 are securely attached to nosepiece 30 by fillets of suitable cement, as shown, or, if desired, the entire hollow center of the triangular stylus supporting portion 32 may be filled with adhesive.

The hollow rectangular portion 31 and the triangular stylus supporting portion 32 are connected by a generally square center portion 37 which is utilized to obtain the objects of the present invention. The square center portion 37 is effectively a window extending transversely of the nosepiece bounded by top and bottom walls 38 and 39, respectively, a forward wall 40 and a rear wall 41 which is also the forward wall of the rectangular hollow portion 31. In a completely assembled cartridge as shown in Figures 1 and 2 the nosepiece 30 is arranged to be positioned within the cartridge housing in such a manner that the extreme forward end of the triangular stylus supporting portion is aligned with the forward edges of the housing halves 11 and 12.

The housing halves 11 and 12 have integrally formed thereon opposed short cylindrical hubs 42 and 43 aligned on a mutual transverse axis which is also the transverse center line of the window of the square center portion 37. In this manner the cylindrical hubs extend within the center opening of the center portion as shown. Surrounding the bases of the hubs 42 and 43 are integrally formed raised areas or bosses 44 and 45 which extend toward the nosepiece 30 and serve as stop means therefor.

Considering now the operation of the apparatus above described, the normal operation of the pick-up cartridge is that undulations in the groove of a record disc are followed and sensed by either of the styli 35 and 36. These undulations are lateral in direction causing the nosepiece to move in the direction of arrow A in Figure 1 and, as a consequence, resulting in the flexing of the transducer element 14 and the generation of an electrical signal. Since the forces at A are applied to nosepiece 30 they are transmitted through the top and bottom walls 38 and 39 to element 14 in substantially unimpeded fashion as these walls are strongest, in essence being thick rectangular beams, in this direction. This results in a relatively high overall transducing efficiency since little force applied to the stylus engaging the groove of a record disc is lost in transmission to the transducer element. A certain degree of mechanical compliance in the lateral direction is required, both for faithful frequency reproduction and for mechanical safety, and this is provided by a proper choice of materials for the clamp pads 18 and 19 and the bender pads 24 and 25.

If accidental lateral forces are applied to the stylus, upon faulty operation of the player mechanism or by careless handling, for example, the combined damping action of the resilient pads 18, 19, 24 and 25 and the final stopping action provided when nosepiece 30 contacts either of the bosses 44 or 45 prevents damage or breakage of the transducer element 14.

If accidental vertical forces are applied three force limiting means are utilized to protect the pick-up cartridge. First, some bending of top and bottom walls 38 and 39 will occur. This bending is also highly desirable to counteract the pinching of the styli in record grooves during normal operation. Second, some deformation of rubber damping member 26 occurs, permitting the transducer element to slip vertically between bender pads 24 and 25. This has the effect of lowering the pick-up cartridge assembly and the lower edge of the assembly with respect to the transducer element 14, nosepiece 30 and the groove engaging stylus will bear upon the record surface R and prevent further vertical forces being applied to the stylus 36 and the transducer element. Third, if the vertical forces acting on the assembly are not neutralized by the two above described safety features, a positive stop is afforded when either the top or bottom wall 38 or 39 engages and bears against the cylindrical hubs 42 and 43. This arrangement is clearly shown in Figure 4 of the drawing where the positions of the nosepiece and the transducer element are indicated by broken lines.

Another type of damaging force which is often applied to pick-up cartridges occurs in removing, replacing or installing such devices. In installing or removing the cartridge from its socket considerable longitudinal force is required. An inadvertent pull upon the styli of prior art pick-up cartridges usually resulted in the complete removal of the styli and transducing mechanism or the dislodgement thereof which rendered such a cartridge useless. However, the possibility of damage due to excessive longitudinal pulling forces is entirely eliminated in the present pick-up cartridge by the stopping action provided when rear wall 41 contacts the hubs 42 and 43. This is illustrated in Figure 4 of the drawing. In a similar manner damage due to an excessive longitudinal pushing force will be prevented as the front wall 40 will contact the hubs 42 and 43.

It should thus be apparent that we have accomplished the objects initially set forth. We have disclosed an improved pick-up cartridge having various protective features which prevent damage of the transducer element and the styli. The arrangement is such that the cartridge assembly is protected from excessive mechanical forces applied in any direction. Also, three separate means are provided for protecting against undue vertical forces—the type of excessive forces most likely to occur during the normal operation of phonograph pick-up cartridges.

In addition, we have provided an improved stylus supporting nosepiece of unitary construction which, in conjunction with bosses and hubs on the cartridge housing, serves to protect the transducer mechanism and styli. It will be noted that the top and bottom walls of the nosepiece are of a generally rectangular cross section to provide strength in one direction and allow bending thereof in another direction. Both the nosepiece and the resultant pick-up cartridge employing the same are characterized by their extreme simplicity and low cost.

It should be apparent that many changes may be made in the illustrated embodiment of the invention without departing from the scope or intent of the invention. Therefore, reference should be had to the following appended claims in determining the true scope of the invention.

We claim:

1. In a phonograph pickup cartridge having an elongated hollow casing with transversely spaced but forwardly projecting side walls, the top and bottom edges of said walls tapering toward each other in the direction of the forward extremity of the casing, said side walls having inwardly extending protrusions within their tapered areas, an elongated piezoelectric transducer having one end clamped centrally within said casing adjacent the rear end thereof and having a freely disposed opposite end portion lying axially inward of said protrusions, a resilient plastic nosepiece having an axial opening in its rear end portion to tightly receive the said free end portion of said transducer and having a front end portion mounting a record-engaging stylus which normally projects outwardly of the planes of said top and bottom edges of said side walls, said nosepiece having an integral portion intermediate its front and rear portions which is apertured transversely to loosely receive said protrusions, the arrangement being such that engagement of said protrusions by the upper or lower wall of the aperture in the nosepiece limits excessive vertical movement of the nosepiece in the slot formed by said side walls while engagement of said protrusions by the front or rear wall of said aperture limits excessive longitudinal movement of said nosepiece in said slot.

2. An assembly according to claim 1 further characterized in that said casing is formed of two molded half sections with the parting plane thereof lying substantially parallel with and in the center of said slot, said protrusions being molded integrally with said side walls.

3. An assembly according to claim 1 further characterized in that said transverse aperture in said nosepiece is generally rectangular in cross section to provide longitudinally elongated top and bottom nosepiece sections which are of substantially uniform cross section throughout their longitudinal extent, the arrangement being such that said sections may flex and thus aid in absorbing the shock of excessive vertical forces which may be applied to the forward extremity of the nosepiece.

References Cited in the file of this patent

UNITED STATES PATENTS

| | | |
|---|---|---|
| D. 141,124 | Sceli | May 8, 1945 |
| 2,249,713 | Imelman | July 15, 1941 |
| 2,438,111 | Campbell | Mar. 23, 1948 |
| 2,476,414 | Hutter | July 19, 1949 |
| 2,563,196 | Spry | Aug. 7, 1951 |
| 2,699,470 | Koren | Jan. 11, 1955 |
| 2,752,428 | Bauer | June 26, 1956 |
| 2,793,254 | Wood | May 21, 1957 |
| 2,851,541 | Wood | Sept. 9, 1958 |